Aug. 8, 1961  A. N. STANTON  2,995,331
STAND FOR SUPPORTING ANTENNA
Filed Jan. 6, 1960  3 Sheets-Sheet 1
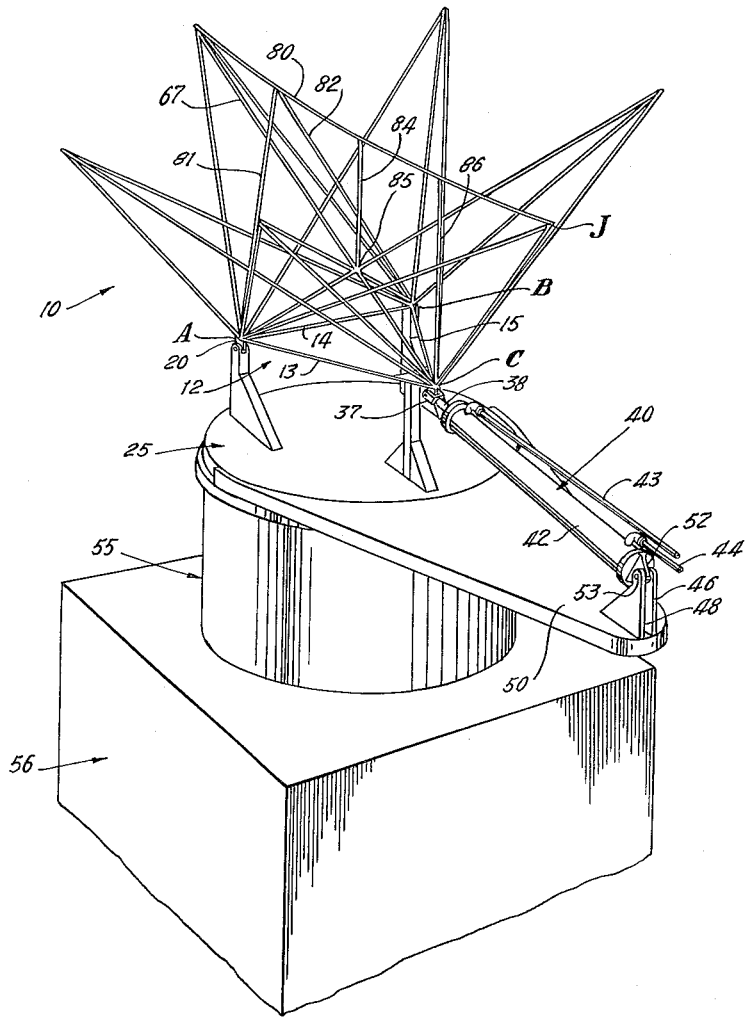
Fig. 1
INVENTOR
BY
ATTORNEY Aug. 8, 1961     A. N. STANTON     2,995,331
STAND FOR SUPPORTING ANTENNA
Filed Jan. 6, 1960     3 Sheets-Sheet 2
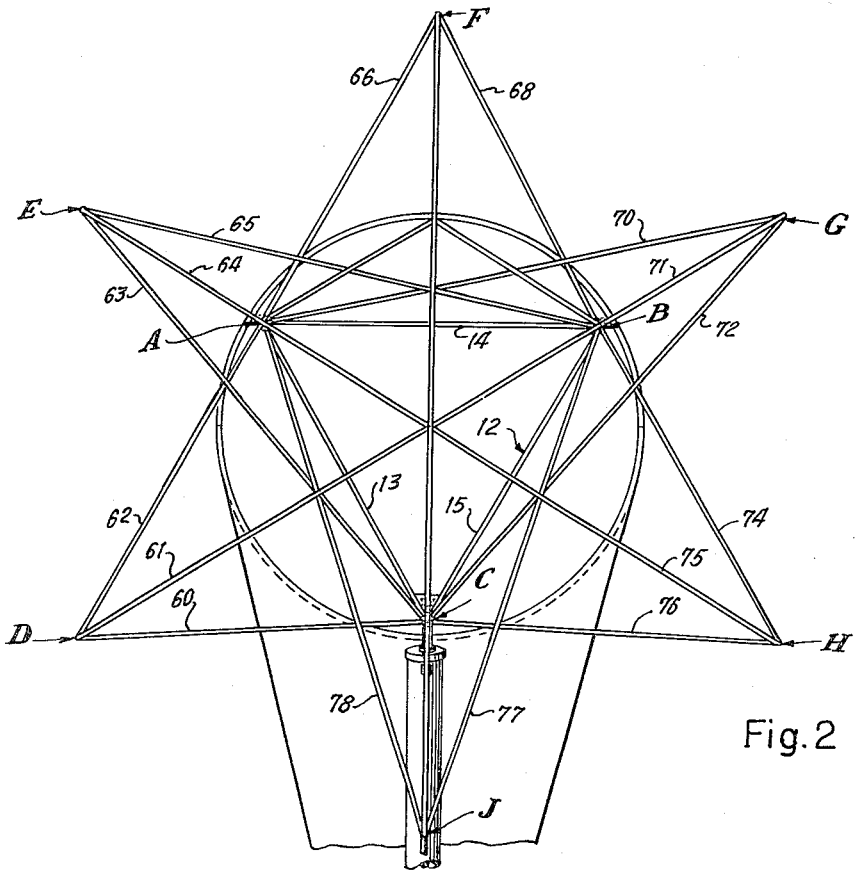
Fig. 2
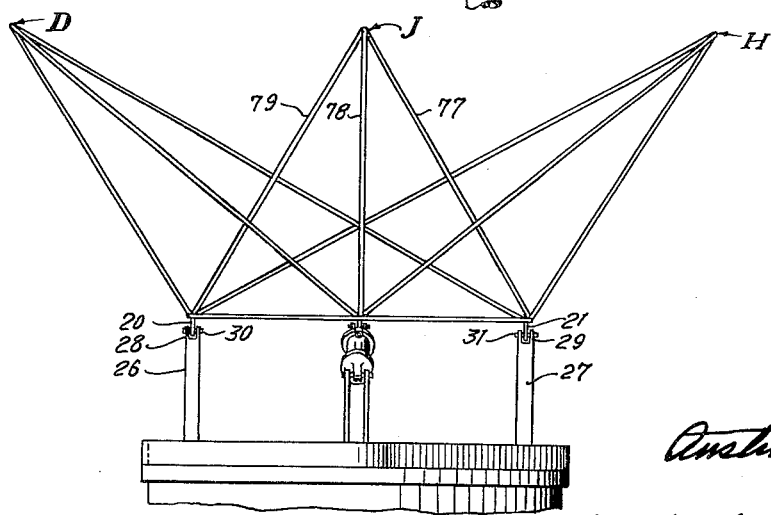
Fig. 3
INVENTOR
BY
ATTORNEY Aug. 8, 1961 A. N. STANTON 2,995,331
STAND FOR SUPPORTING ANTENNA
Filed Jan. 6, 1960 3 Sheets-Sheet 3

INVENTOR
Anselm N. Stanton
BY Walter J. Jaqmin
ATTORNEY

United States Patent Office 2,995,331
Patented Aug. 8, 1961

2,995,331
STAND FOR SUPPORTING ANTENNA
Austin N. Stanton, 2201 Walnut St., Garland, Tex.
Filed Jan. 6, 1960, Ser. No. 781
3 Claims. (Cl. 248—163)

This invention relates to structures and more particularly to a structure affording a maximum rigidity.

An object of the invention is to provide a new and improved structure for use in devices requiring a maximum rigidity.

Another object is to provide a structure formed of a plurality of members arranged to impart a maximum rigidity to the structure.

Another object is to provide a structure formed of a plurality of members arranged to provide the structure with maximum rigidity in all planes.

Still another object is to provide a structure formed of a plurality of members wherein three of the members are connected to form a triangle, the structure being supported at the apices of the triangle and all other members of the structure also being connected to the apices of the triangle to impart a maximum rigidity to the structure.

A further object is to provide a structure formed of a plurality of elongate members wherein three of the members are connected in a triangle to form a base, the base being supported at its apices, the others of the members being connected to the base at the apices and extending therefrom to form a plurality of spaced support points.

A further object is to provide a structure formed of a plurality of elongate members wherein three of the members are connected in a triangle to form a base, the base being supported at its apices, the others of the members being connected to the base at the apices and extending therefrom to form a plurality of spaced support points, each of the support points being formed by connected ends of three members whose other ends extend to and are connected to the apices of the base.

Another object is to provide a structure for devices which must have a maximum rigidity, such as antennae which is formed of a plurality of elongate members, three of the members being connected to form a triangular base and the others of the members being secured at the apices of the base and extending therefrom to form a plurality of spaced support points on which other elements may be secured, such as the reflecting screen or member of an antenna.

Still another object is to provide a structure wherein three elongate members extend from the apices of the base converge to each support point, such elongate members each lying at the intersection of two angularly disposed planes in which the other two elongate members lie.

Additional objects and advantages of the invention will be readily apparent from the reading of the following description of a device constructed in accordance with the invention, and reference to the accompanying drawings thereof, wherein:

FIGURE 1 is a perspective view of a structure embodying the invention, shown as the support structure of an antenna;

FIGURE 2 is a top plan view of the structure shown in FIGURE 1;

FIGURE 3 is a side view taken on line 3—3 of FIGURE 2;

Figure 4:
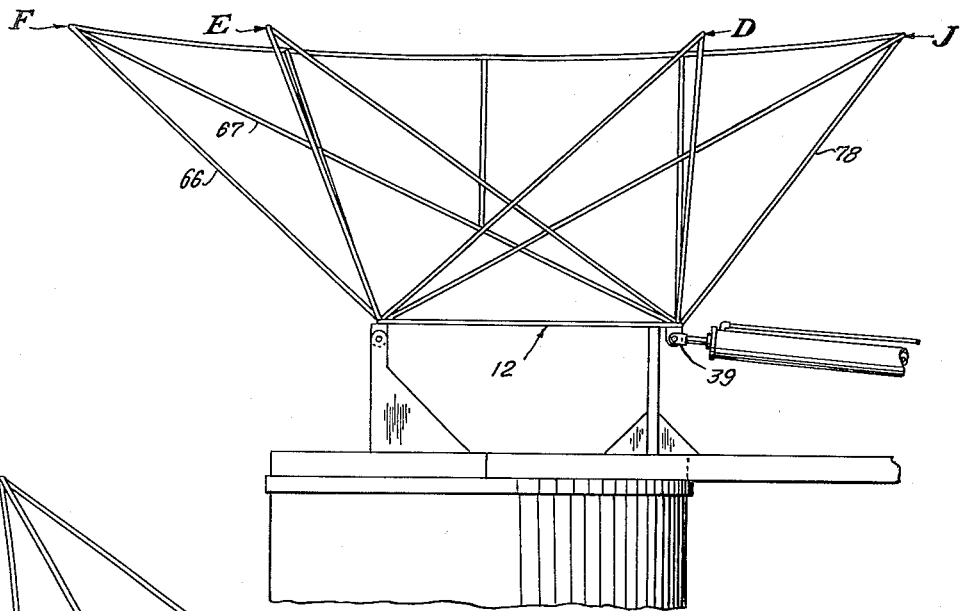
FIGURE 4 is a side view taken on line 4—4 of FIGURE 3.
Figure 5:
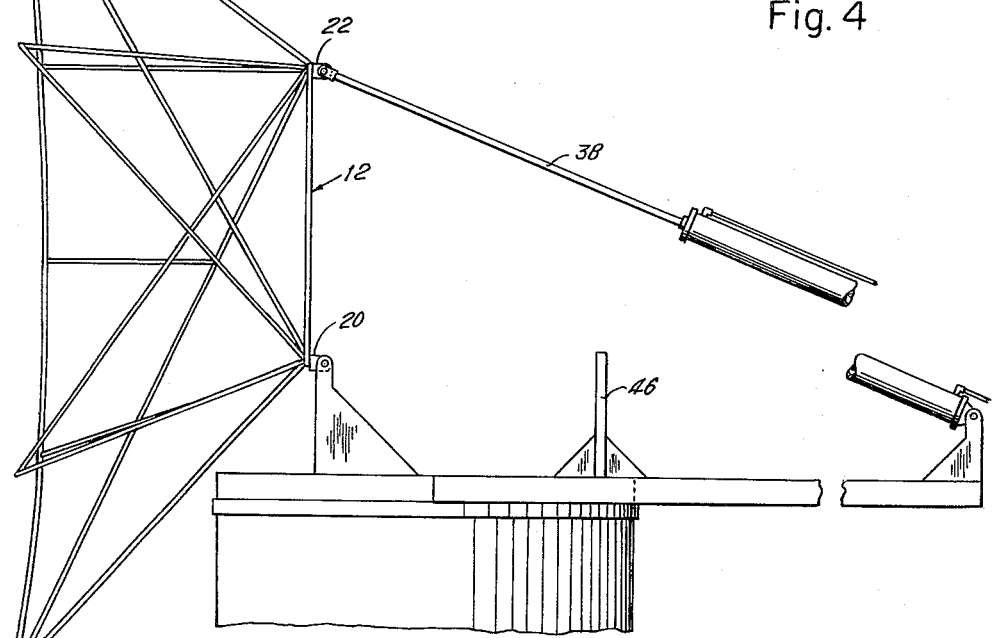
FIGURE 5 is a side view similar to FIGURE 4 showing the structure tilted from the horizontal position illustrated in FIGURE 4 to a vertical position.

Referring now to the drawing, the device 10 embodying the invention is illustrated as a supporting structure for an antenna which requires utmost rigidity since the reflecting screen of the antenna may not deviate from a desired curvature to any appreciable extent even though the antenna is movable through 90 degrees from the horizontal position illustrated in FIGURE 4 to the vertical position illustrated in FIGURE 5 and may be of considerable size, some antennae exceeding 160 feet in diameter. The structure 10 for providing this utmost rigidity includes a base 12 formed of the elongate members 13, 14 and 15 which are connected at their ends to form the triangular base 12. The elongate members may be formed of any suitable structural members, such as angles or channels. The apices A, B and C of the base may be provided with dependent lugs 20, 21 and 22, respectively, by means of which the base 12 may be movably supported on the turntable 25. The turntable is provided with support blocks 26 and 27 having upwardly opening recesses 27 and 28, respectively, in which are receivable the lugs 20 and 21. Pivot pins or shafts 30 and 31 extend through aligned apertures in the lugs 20 and 21 and the support blocks 26 and 27, respectively, and since the pins 30 and 31 are aligned, the base may be pivoted about the axis of the pivot pins 30 and 31 through an arc of 90 degrees between the position illustrated in FIGURE 4 and the position illustrated in FIGURE 5.

The lug 22 at the apex C of the base 12 is received between the arms of the bifurcated bracket 37 of the piston 38 of a ram 40. The piston of the ram is of course connected to the inner end of the piston rod and is movable between its retracted and extended positions in a cylinder 42 in the unusual manner by means of fluid under pressure introduced into the cylinder on opposite side of the piston through the conduits 43 and 44. It will be apparent that when fluid under pressure is introduced into the cylinder through the conduit 43 while the conduit 44 is open, the pressure of the fluid will move the piston inwardly to cause the base to move from the position illustrated in FIGURE 5 to the position illustrated in FIGURE 4 and that when pressure under fluid is introduced into the cylinder through the conduit 44 while the conduit 43 is open, the piston will move the base from the position illustrated in FIGURE 4 to the position illustrated in FIGURE 5. A support block 46 is mounted on the turntable to be engaged by the lug 22 to support the antenna in its horizontal position as illustrated in FIGURE 4. The hydraulic ram cylinder 43 has its end pivotally secured to the support blocks 47 and 48 of the extension 50 of the turntable. The cylinder has a lug 52 extending between the support blocks 47 and 48 and is pivotally secured thereto by a pivot pin 53 which extends through aligned apertures in the support blocks and in the cylinder lug 52. It will thus be apparent that the cylinder may pivot about the pivot 53 while the lug 22 at the apex C of the base 12 may pivot relative to the piston 38 due to its pivotal connection thereto by means of the pivot pin 39.

The turntable 25 is rotatably mounted in a turntable base 55 which may be provided with a suitable drive means for rotating the turntable through 360 degrees. The turntable base 55 is mounted on any suitable supporting structure 56, such as the top of a tower if it is desired that the antenna be at an elevated position. It will thus be apparent that the structure 10 may be moved about an axis through 90 degrees and about a second axis perpendicular to the first axis through 360 degrees so that the antenna may be caused to scan a wide area to either receive or transmit wave energy.

The structure 10 includes a plurality of spaced support points D, E, F, G, H and J to which the reflector screen of an antenna may be secured to be rigidly supported thereby against any deflection from a desired curvature. Each of the support points is formed by three elongate members which are connected to the three apices of the base 12 whereby all forces to which the base is subjected are concentrated at the apices. For example, the support point D is formed of the elongate members 60, 61 and 62 which are secured to the apices C, A and B, respectively. The support point E is formed by the joined outer ends of the elongate members 63, 64 and 65 whose opposite ends are supported by and rigidly connected to the apices C, A and B, respectively, of the base. The support point F is provided by the elongate members 66, 67 and 68, respectively, whose outer ends converge and are secured to one another to form the support point F and whose opposite spaced ends extend to and are connected to apices A, C and B, respectively, of the base. The support point G is provided by the elongate members 70, 71 and 72 whose outer converged ends are connected to form the support point G and whose opposite spaced ends extend and are connected to the apices A, B and C, respectively, of the base. The support point H is similarly provided for by the elongate members 74, 75 and 76 whose outer ends converge and are connected together to form the support point H and whose spaced ends extend to and are connected to the apices B, A and C, respectively, of the base. The support point J similarly is formed by the elongate members 77, 78 and 79, respectively, and whose outer ends are connected together to form support point J and whose spaced opposite ends extend divergently to the apices B, C and A, respectively, of the base and are rigidly secured thereto.

It will be noted that each of the support or load bearing points D, E, F, G, H and J are formed by three elongate members which extend from the apices of the base and therefore all forces, stresses and strains due to any load imposed on the support point is transmitted directly to the apices of the triangular base so that no such stresses or strains are imposed or imparted to the base members 13, 14, and 15. In addition, it will be seen that each of the support points is supported by three elongate members which diverge toward the apices of the base so that each support point is provided by triangularly arranged members. For example, the support point D is supported by the triangularly arranged elongate members 61 and 62 and the base member 14, the triangularly arranged elongate members 60 and 61 and the base member 12 and the triangularly arranged members 60 and 62 and the base member 13. It will thus be apparent that each support point is very rigidly provided for by the base and by the elongate members even if the lengths of the members are great since the elongate members of each support point and the three base members form four triangles disposed in four planes angularly disposed relative to one another. As a result, the position of the support point D relative to the other support points and to the base is very rigidly fixed and will not move relative to the other support points and to the base even though extremely heavy loads may be imposed thereon so that the support structure 10 forms a support of maximum rigidity for any other structure or load which is to be supported thereby or to which it is to be subjected. The support points are disposed outwardly of the base so that they encompass a greater area than the base.

In the antenna support structure 10 illustrated in the drawings, the support points may be connected together by any suitable connecting members, such as the member 80 which extends between the support points F and J. The connecting member 80 is curved slightly as would be required to provide support for a dish-shaped antenna reflecting screen or member. The other support points may similarly be connected by other such connecting members. The connecting member 80 can be supported between the support points F and J by intermediate support members 81 and 82 which extend upwardly to the connecting member 80 intermediate its ends from a pair of apices of the base 12. The connecting member can also be supported intermediate its ends by a connecting member 84 which extends from a point intermediate the ends of the connecting member to the intersection as at 85 of any of the elongate members. The connecting member can also be connected adjacent its ends by a single intermediate support member 86 which extends directly from an apex of the base such as the apex C.

Any other connecting members extending between other pairs of connecting members can be supported intermediate their ends by similar support members similarly connected to the base or to the elongate member. Such other connecting members in the case of the antenna structure 10 would curve inwardly toward the base from each pair of support points to provide concave support surfaces lying in a predetermined curved plane to support a reflector screen of an antenna.

If desired, if the antennae structure is of greater diameter than the spacing between opposed support points such as the support points F and J, D and G, or E and H, a second course of elongate members may be provided which would be connected to the support points and would extend outwardly therefrom. Each of such additional support points would of course be formed by elongate members whose inner ends would be connected to three of the support points and whose outer ends would converge to form support points which would be disposed outwardly of the support points illustrated in the drawings. It will be apparent that the various members of the structure may be formed of any other structural members such as angle or channels connected to one another at adjoining ends by welding, by suitable coupling members or in any other suitable manner.

It will now be seen that a support structure 10 for supporting any suitable load, such as the reflector screen of an antenna has been illustrated and described whose spaced support points, to which the supported object or structure may be connected, are each provided by three elongate members which extend from the support point to the apices of a triangular base which in turn is supported at its apices.

It will further be seen that each support point is formed by three elongate members which diverge from the support point to the three apices of the base to form with the base members four triangles disposed in mutually angularly extending and intersecting planes whereby each support point is rigidly and immovably positioned relative to the other support points and to the base.

It will further be apparent that all stresses and strains to which the structure is subjected by the loads borne on its support points are transmitted to the apices of the triangular base which in turn is supported on any supporting structure at its apices and that no loads, stresses or strains are imparted to the base intermediate the apices thereof so that the structure has a maximum rigidity.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A structure including: a triangular base; means for supporting said base at its apices; and a plurality of support points spaced from each other and said base, each of said support points being provided by three elongate members whose adjacent ends are connected to form the support point, said elongate members extending from the support points to the apices of said base, said elongate members of each support point and said base being disposed in four intersecting mutually angularly extending planes.

2. A structure including: a base having three members connected at adjacent ends to form a triangle; and a plurality of support points spaced from each other and said base, each of said support points being provided by three elongate members whose adjacent ends are connected to form the support point, said elongate members extending from the support points to the apices of said base, said elongate members of each support point and said members of said base being disposed in four intersecting mutually angularly extending planes, said support points being disposed outwardly of said base.

3. A structure including: a base having three members connected at adjacent ends to form a triangle; a plurality of support points spaced from each other and said base, each of said support points being provided by three elongate members whose adjacent ends are connected to form the support point, said elongate members extending from the support points to the apices of said base, said elongate members of each support point and said members of said base being disposed in four intersecting mutually angularly extending planes; and means at the apices of said base for supporting said base.

References Cited in the file of this patent

UNITED STATES PATENTS 1,697,789     Snyder _____ June 1, 1929